(12) United States Patent
Castillo et al.

(10) Patent No.: US 9,020,435 B2
(45) Date of Patent: *Apr. 28, 2015

(54) SYSTEM AND METHOD FOR AUTOMATED PAIRING BETWEEN REMOTE CONTROL AND CONTROLLABLE DEVICE

(71) Applicant: Intel Corporation, Santa Clara, CA (US)

(72) Inventors: Michael J. Castillo, Hillsboro, OR (US); Richard S. Bell, Portland, OR (US); Anil Kumar, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 132 days.

This patent is subject to a terminal disclaimer.

(21) Appl. No.: 13/802,352

(22) Filed: Mar. 13, 2013

(65) Prior Publication Data

US 2014/0273844 A1 Sep. 18, 2014

(51) Int. Cl.
| | |
|---|---|
| *H04B 7/00* | (2006.01) |
| *H04B 7/26* | (2006.01) |
| *G08C 17/02* | (2006.01) |
| *H04B 5/02* | (2006.01) |
| *G08C 23/04* | (2006.01) |

(52) U.S. Cl.
CPC .............. *H04B 7/2612* (2013.01); *G08C 17/02* (2013.01); *G08C 2201/20* (2013.01); *H04B 5/02* (2013.01); *G08C 2201/60* (2013.01); *G08C 23/04* (2013.01)

(58) Field of Classification Search
CPC . H04W 36/0011; H04W 60/00; H04W 80/04; H04W 88/182; H04W 8/04; H04W 8/26; H04N 21/4126; H04N 21/4383; H04N 21/482; H04N 21/6181; H04N 21/6547; H04N 21/6587; H04N 5/232; H04L 69/329; H04L 29/12009; H04L 29/12207; H04L 61/2015; H04L 67/04; H04L 67/2842; H04L 29/12028; H04L 61/103; H04L 63/102; H04L 63/164
USPC ........................ 340/12.17, 12.23, 286.01, 4.3; 455/41.1–41.3, 436, 432.1, 438, 439
See application file for complete search history.

(56) References Cited

U.S. PATENT DOCUMENTS

| | | | |
|---|---|---|---|
| 2010/0052870 A1* | 3/2010 | King .......................... | 340/286.02 |
| 2012/0297440 A1* | 11/2012 | Reams et al. .................. | 725/131 |
| 2013/0212270 A1* | 8/2013 | Hsieh et al. .................... | 709/225 |

\* cited by examiner

*Primary Examiner* — Golam Sorowar
(74) *Attorney, Agent, or Firm* — Schwabe, Williamson & Wyatt, P.C.

(57) ABSTRACT

In embodiments, apparatuses, methods and storage media are described that are associated with remote control of media devices. In embodiments, a remote control and a content player may be configured to facilitate a secured pairing process. The remote control may be configured to send non-secured signals (such as through an IR transmitter) as well as send and receive secured signals (such as via Bluetooth™ using an RF transceiver). The remote control, in response to being turned on or asked to pair, may send a pairing request to the player that includes an identifier for the remote control and which identifies the remote control as an eligible pairing device without requiring separate entry of a security code by a user. The remote control and player may then perform a pairing process without requiring additional action on the part of a user. Other embodiments may be described and/or claimed.

25 Claims, 8 Drawing Sheets

SYSTEM AND METHOD FOR AUTOMATED PAIRING BETWEEN REMOTE CONTROL AND CONTROLLABLE DEVICE

TECHNICAL FIELD

The present disclosure relates to the field of data processing, in particular, to apparatuses, methods and systems associated with remote control of media devices.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Advances in computing, networking and related technologies have led to proliferation in the availability of content, and the manners in which the content is consumed. Today, myriad content may be made available from various sources of content, including but not limited to fixed medium (e.g., Digital Versatile Disk (DVD)), broadcast, cable operators, satellite channels, Internet, and so forth. Users may consume content with a television set, a laptop or desktop computer, a tablet, a smartphone, or other devices of the like. Users may also wish to view content from one or more content consumption devices, and may desire facilitated control of these devices.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the Figures of the accompanying drawings.

DETAILED DESCRIPTION

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "logic" and "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
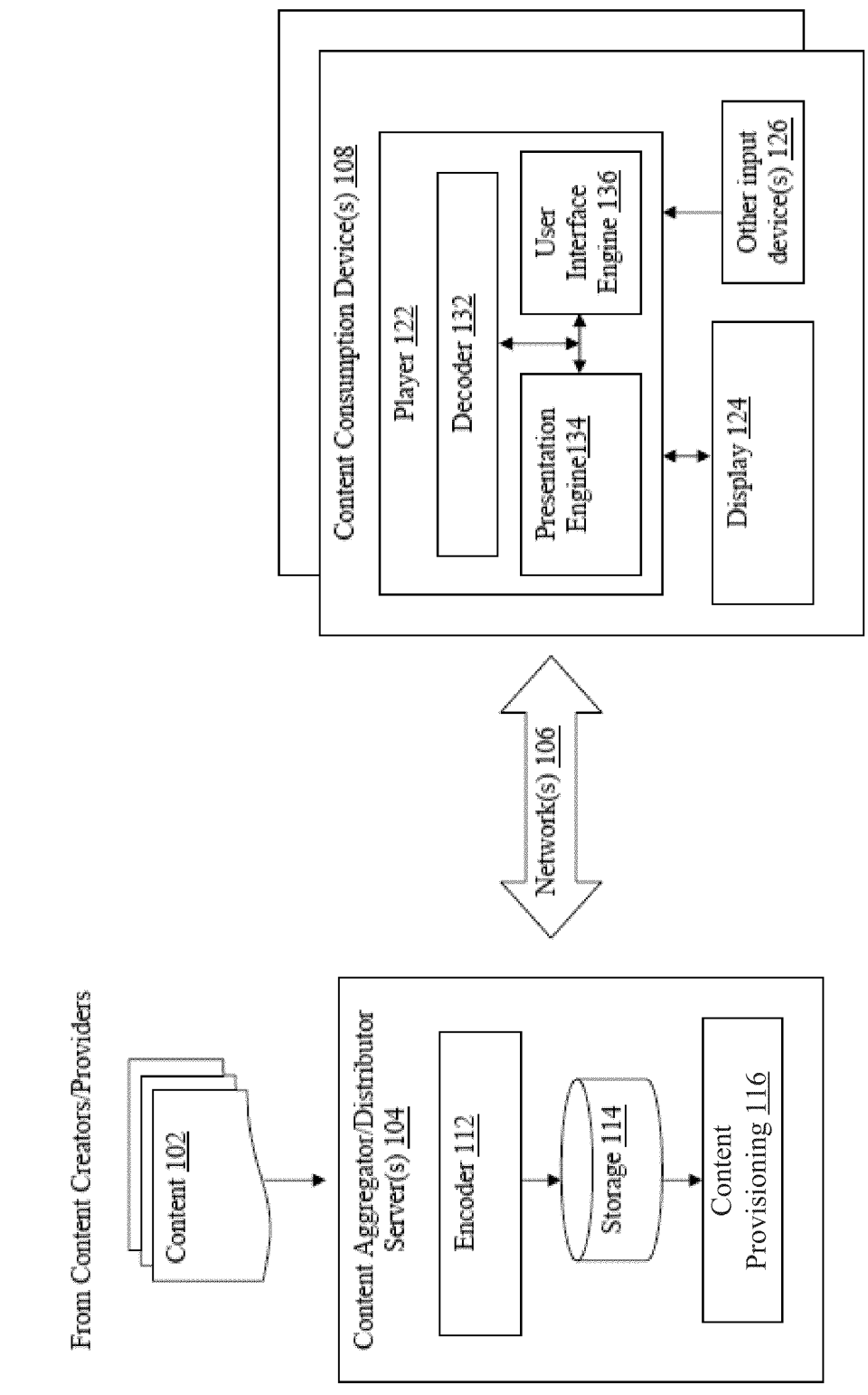
FIG. 1 illustrates an example arrangement for content distribution and consumption, in accordance with various embodiments.

Referring now to FIG. 1, an arrangement for content distribution and consumption, in accordance with various embodiments, is illustrated. As shown, in embodiments, arrangement 100 for distribution and consumption of content may include a number of content consumption devices 108 coupled with one or more content aggregator/distributor servers 104 via one or more networks 106. Content aggregator/distributor servers 104 may be configured to aggregate and distribute content to content consumption devices 108 for consumption, e.g., via one or more networks 106.

In embodiments, as shown, content aggregator/distributor servers 104 may include encoder 112, storage 114 and content provisioning 116, which may be coupled to each other as shown. Encoder 112 may be configured to encode content 102 from various content providers, and storage 114 may be configured to store encoded content. Content provisioning 116 may be configured to selectively retrieve and provide encoded content to the various content consumption devices 108 in response to requests from the various content consumption devices 108. Content 102 may be media content of various types, having video, audio, and/or closed captions, from a variety of content creators and/or providers. Examples of content may include, but are not limited to, movies, TV programming, user created content (such as YouTube video, iReporter video), music albums/titles/pieces, and so forth. Examples of content creators and/or providers may include, but are not limited to, movie studios/distributors, television programmers, television broadcasters, satellite programming broadcasters, cable operators, online users, and so forth.

In various embodiments, for efficiency of operation, encoder 112 may be configured to encode the various content 102, typically in different encoding formats, into a subset of one or more common encoding formats. However, encoder 112 may be configured to nonetheless maintain indices or cross-references to the corresponding content in their original encoding formats. Similarly, for flexibility of operation, encoder 112 may encode or otherwise process each or selected ones of content 102 into multiple versions of different quality levels. The different versions may provide different resolutions, different bitrates, and/or different frame rates for transmission and/or playing. In various embodiments, the encoder 112 may publish, or otherwise make available, information on the available different resolutions, different bitrates, and/or different frame rates. For example, the encoder 112 may publish bitrates at which it may provide video or audio content to the content consumption device(s) 108. Encoding of audio data may be performed in accordance with, e.g., but are not limited to, the MP3 standard, promulgated by the Moving Picture Experts Group (MPEG). Encoding of video data may be performed in accordance with, e.g., but are not limited to, the H264 standard, promulgated by the International Telecommunication Unit (ITU) Video Coding Experts Group (VCEG). Encoder 112 may include one or more computing devices configured to perform content portioning, encoding, and/or transcoding, such as described herein.

Storage 114 may be temporal and/or persistent storage of any type, including, but not limited to, volatile and non-volatile memory, optical, magnetic and/or solid state mass storage, and so forth, Volatile memory may include, but are not limited to, static and/or dynamic random access memory. Non-volatile memory may include, but are not limited to, electrically erasable programmable read-only memory, phase change memory, resistive memory, and so forth.

Figure 2:
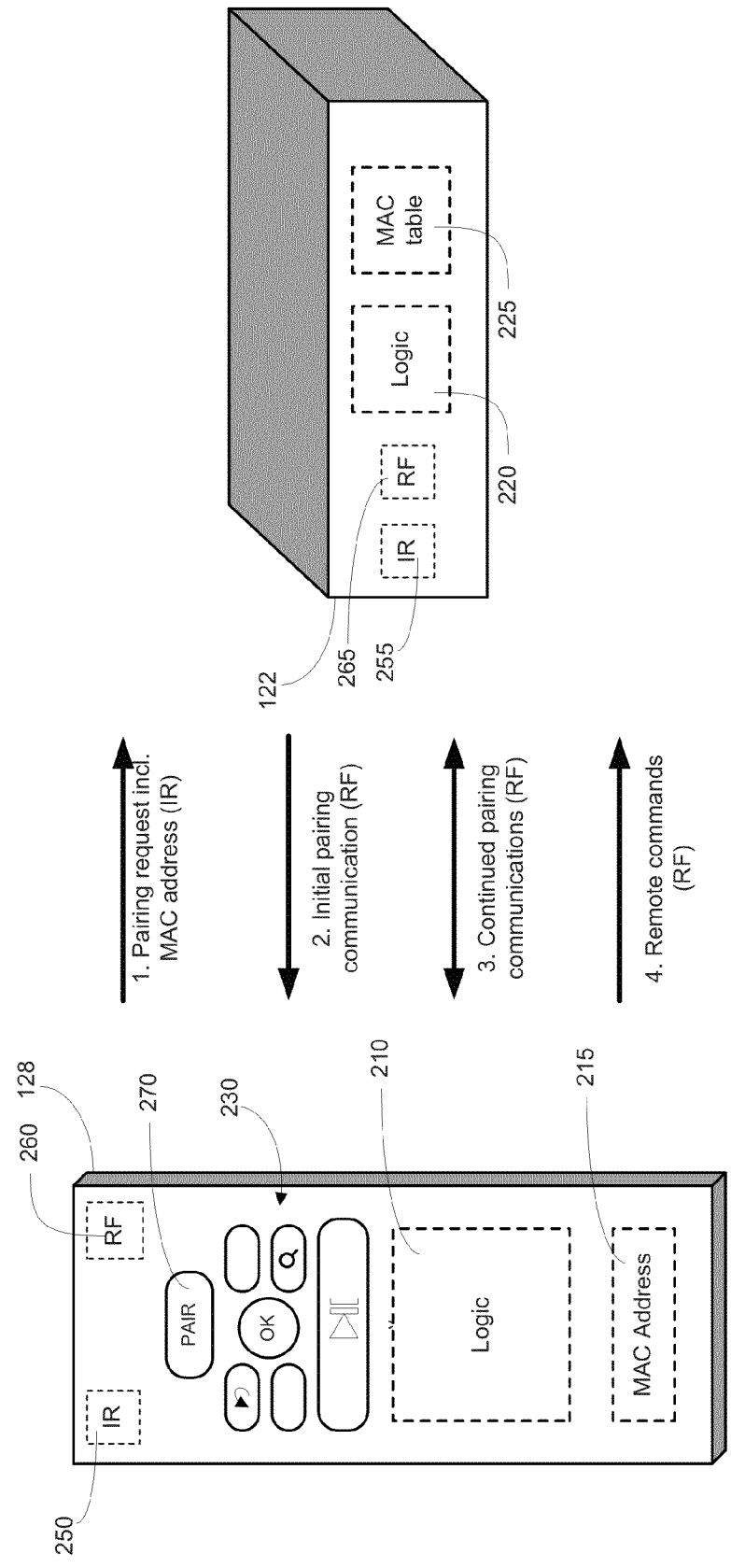
FIG. 2 illustrates an example arrangement of a remote control and a player in accordance with various embodiments.

In various embodiments, content provisioning 116 may be configured to provide encoded content as discrete files and/or as continuous streams of encoded content. Content provisioning 116 may be configured to transmit the encoded audio/video data (and closed captions, if provided) in accordance with any one of a number of streaming and/or transmission protocols. The streaming protocols may include, but are not limited to, the Real-Time Streaming Protocol (RTSP). Transmission protocols may include, but are not limited to, the transmission control protocol (TCP), user datagram protocol (UDP), and so forth. In various embodiments, content provisioning 116 may be configured to provide media files that are packaged according to one or more output packaging formats. In various embodiments, content provisioning 116 may include a transpackager, such as illustrated in FIG. 2 below, which may be configured to package content files encoded by the encoder 112 in one or more output packaging formats for subsequent provisioning. Particular embodiments of transpackagers and transpackaging may be described below.

Networks 106 may be any combinations of private and/or public, wired and/or wireless, local and/or wide area networks. Private networks may include, e.g., but are not limited to, enterprise networks. Public networks, may include, e.g., but is not limited to the Internet. Wired networks, may include, e.g., but are not limited to, Ethernet networks. Wireless networks, may include, e.g., but are not limited to, Wi-Fi, or 3G/4G networks. It would be appreciated that at the content distribution end, networks 106 may include one or more local area networks with gateways and firewalls, through which content aggregator/distributor server 104 communicate with content consumption devices 108. Similarly, at the content consumption end, networks 106 may include base stations and/or access points, through which consumption devices 108 communicate with content aggregator/distributor server 104. In between the two ends may be any number of network routers, switches and other networking equipment of the like.

However, for ease of understanding, these gateways, firewalls, routers, switches, base stations, access points and the like are not shown.

In various embodiments, as shown, a content consumption device 108 may include player 122, display 124 and user input device 126. Player 122 may be configured to receive streamed content, decode and recover the content from the content stream, and present the recovered content on display 124, in response to user selections/inputs from user input device 126.

In various embodiments, player 122 may include decoder 132, presentation engine 134 and user interface engine 136. Decoder 132 may be configured to receive streamed content, decode and recover the content from the content stream. Presentation engine 134 may be configured to present the recovered content on display 124, in response to user selections/inputs. In various embodiments, decoder 132 and/or presentation engine 134 may be configured to present audio and/or video content to a user that has been encoded using varying encoding control variable settings in a substantially seamless manner. Thus, in various embodiments, the decoder 132 and/or presentation engine 134 may be configured to present two portions of content that vary in resolution, frame rate, and/or compression settings without interrupting presentation of the content. User interface engine 136 may be configured to receive signals from user input device 126 that are indicative of the user selections/inputs from a user, and to selectively render a contextual information interface as described herein.

While shown as part of a content consumption device 108, display 124 and/or user input device(s) 126 may be standalone devices or integrated, for different embodiments of content consumption devices 108. For example, for a television arrangement, display 124 may be a stand alone television set, Liquid Crystal Display (LCD), Plasma and the like, while player 122 may be part of a separate set-top set, and user input device 126 may be a separate remote control (such as described below), gaming controller, keyboard, or another similar device. Similarly, for a desktop computer arrangement, player 122, display 124 and user input device(s) 126 may all be separate stand alone units. On the other hand, for a tablet arrangement, display 124 may be a touch sensitive display screen that includes user input device(s) 126, and player 122 may be a computing platform with a soft keyboard that also includes one of the user input device(s) 126. Further, display 124 and player 122 may be integrated within a single form factor. Similarly, for a smartphone arrangement, player 122, display 124 and user input device(s) 126 may be likewise integrated.

Referring now to FIG. 2, an example arrangement of a remote control 128 and a player 122 is illustrated in accordance with various embodiments. In various embodiments, the remote control 128 may include one or more implementations of the user input device(s) 126 described above. In various embodiments, the remote control 128 and the player 122 may be configured to communicate via one or more communication channels. For example, the remote control 128 may be configured to send commands to the player 122 to control the player 122. In some embodiments, the player 122 may likewise be able to send commands and/or information to the remote control 128, such as to affect one or more displays on the remote control 128.

In various embodiments, the remote control 128 and the player 122 may be configured to communicate via non-secured signals. For example, the remote control may include a line-of sight transmitter, such as and infrared ("IR") transmitter 250, that is configured to transmit signals to the player 122.

In various embodiments, the signals sent by the IR transmitter 250 may be receivable and understandable by the player without requiring that a secure communication channel be previously established between the remote control 128 and the player 122. In various embodiments, the player may thus be configured to receive the non-secured signals, such as through an IR receiver 255. In various embodiments, the IR transmitter of the remote control 128 and/or the IR receiver of the player 122 may be combined with an IR receiver and/or IR transmitter, respectively to form an IR transceiver. Thus, in some embodiments, two-way non-secured communications may be performed between the remote control 128 and the player 122.

In various embodiments, the remote control 128 and the player 122 may be configured to communicate via a secure communication channel. For example, in some embodiments, the remote control 128 and the player 122 may be configured to communicate through a Bluetooth™ communication channel. In various embodiments, the remote control 128 and the player 122 may be configured to communicate via the secure communication channel using radio frequency ("RF") transceivers 260 and 265, respectively. In various embodiments, however, the remote control 128 and the player 122 may be configured to establish the secure communication channel prior to communicating via the secure communication channel. The remote control 128 and the player 122 may be configured to establish the secure communication channel through a pairing process that incorporates the sharing of an identifier for the remote control 128 and/or the player 122 and the sharing of encryption keys between the remote control 128 and the player 122.

In various embodiments, the remote control 128 and the player 122 may be configured to facilitate performance of the pairing process through communication of non-secured signals. For example, the remote control 128 may be configured to send a pairing request to the player 122 using the IR transmitter 250. In various embodiments, the pairing request may include an identifier for the remote control 128, such as a media access control address ("MAC address") 215, which may be maintained on the remote control 128, as shown. In various embodiments, the remote control 128 may be configured to transmit a hashed version of the MAC address rather than the MAC address itself. In various embodiments, the MAC address 215 may be pre-programmed into the remote control 128 to be maintained thereby, avoiding the need to separately configure the remote control 128 with the MAC address 215.

In various embodiments, the remote control 128 may be configured to transmit the pairing request in response to a user-based indication to pair the remote control 128 and the player 122. For example, remote control 128 may include a pairing button 270, demarcated from other buttons and user-interface elements 230, which, when activated, may cause the remote control 128 to transmit the pairing request. In other embodiments, the remote control 128 may transmit the pairing request in response to other user actions, such as insertion of a battery (not shown) into remote control 128 or removal of a tab adjacent to a battery to complete an electronic circuit in the remote control 128. In various embodiments, the pairing request may facilitate the pairing process without requiring the use of separate entry of a personal identification number ("PIN") or other secure code by a user of the remote control 128. This may allow the user to more easily initiate the pairing process through a single action and without additional effort.

In various embodiments, the player 122 may be configured, in response to receipt of the pairing request by the IR receiver 255 of the player 122, to initiate pairing communications with the remote control 128. The player 122 may be configured to initiate pairing communications by sending an initial pairing communication using the RF transmitter 265. In various embodiments, the initial pairing communication (as well as subsequent pairing communications) may incorporate the MAC address 215 of the remote control 128.

In various embodiments, the player 122 may initiate the pairing communications after performing an authorization check to determine if the MAC address 215 of the remote control 128 is identified in a MAC table 225 (or other data structure) that includes authorized MAC addresses. In various embodiments, the MAC table 225 may be obtained by the player 122 from a separate source, such as by downloading the MAC table 225 via network 106 or another network from a separate computing device (not shown). In various embodiments, if the remote control 128 is configured to send a hash of its MAC address 215 to the player 122, the player 122 may be configured to maintain hashes in the MAC table 225 rather than full MAC addresses.

In various embodiments, after initiating pairing communications, the player 122 and the remote control 128 may continue pairing communications using the RF transceivers 265 and 260, respectively. After completion of the pairing communications (which may include known Bluetooth™ pairing protocols) the remote control 128 and player 122 may establish a secure communication channel, including exchange of encryption keys to be used in subsequent secure communications. In various embodiments, the communications between the remote control 128 and the player 122 may establish a paring between the two devices, or both connection and pairing, as may be understood. Thereafter, there remote control 128 may be configured to send commands to the player 122 via the secure communication channel using the RF transceiver 160. In various embodiments, performance of the actions described above may be facilitated through the use of hardware or software logic 210 and/or 220 located on the remote control 128 and/or player 122 respectively.

Figure 3:
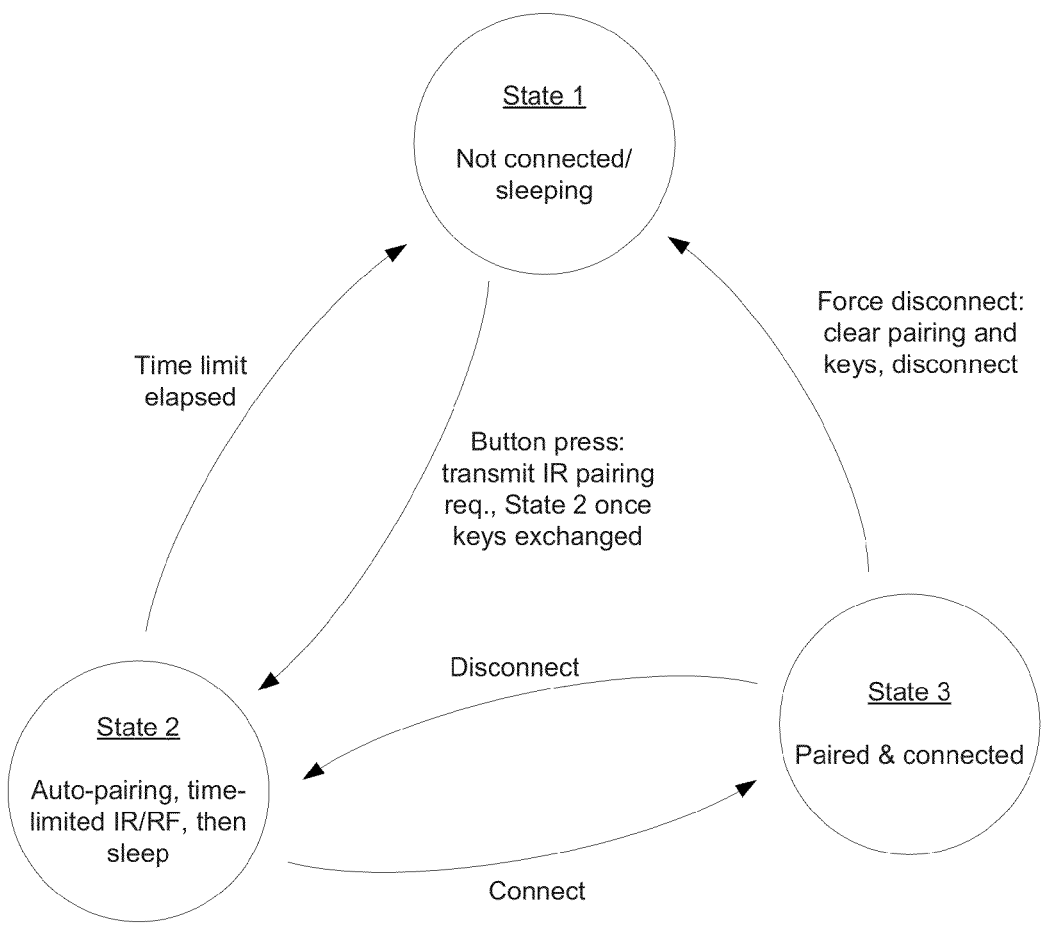
FIG. 3 illustrates an example state diagram for the remote control, in accordance with various embodiments.

FIG. 3 illustrates an example state diagram for the remote control 128, in accordance with various embodiments. In various embodiments, the logic 210 of the remote control 128 may be configured to maintain or cause transitions between various logical states to effect the actions and operations described herein. For example, the remote control 128 may, in various embodiments, include a not connected/sleeping state (State 1), where the remote control 128 is not actively connected to any player 122. From State 1, if a button press occurs, such as activation of the pairing button 270, the remote control may be configured to transition to an auto-pairing state (State 2). During this transition, the remote control 128 may transmit the pairing request via the IR transmitter 250. The remote control 128 may also exchange encryption keys with the player 122; State 2 may be reached after these keys are exchanged.

In State 2, the remote control 128 may be in an auto-pairing state. In this state, the remote control 128 may communicate with the player 122 (such as via IR and/or RF) to pair the two devices. Once the two are connected, the remote control 128 may be configured to transition to a paired & connected state (State 3). However, the remote control 128 may be configured to stay in State 2 for a pre-determined amount of time (e.g., 30 seconds). Thus, if the remote control 128 has not transitioned to State 3 after the time has elapsed, the remote control 128 may return to State 1, where it may be not connected.

Once reaching State 3, however, the remote control 128 may stay paired & connected unless disconnected. If a traditional disconnect occurs, then the remote control 128 may return to State 2 to resume auto-pairing. If, however, the remote control 128 receives a command to force a disconnect (such as through user indication through a dedicated user interface element), then the remote control 128 may return to the not connected/sleeping state of State 1. During this transition, the remote control 128 may clear its pairing and keys and disconnect.

Figure 4:
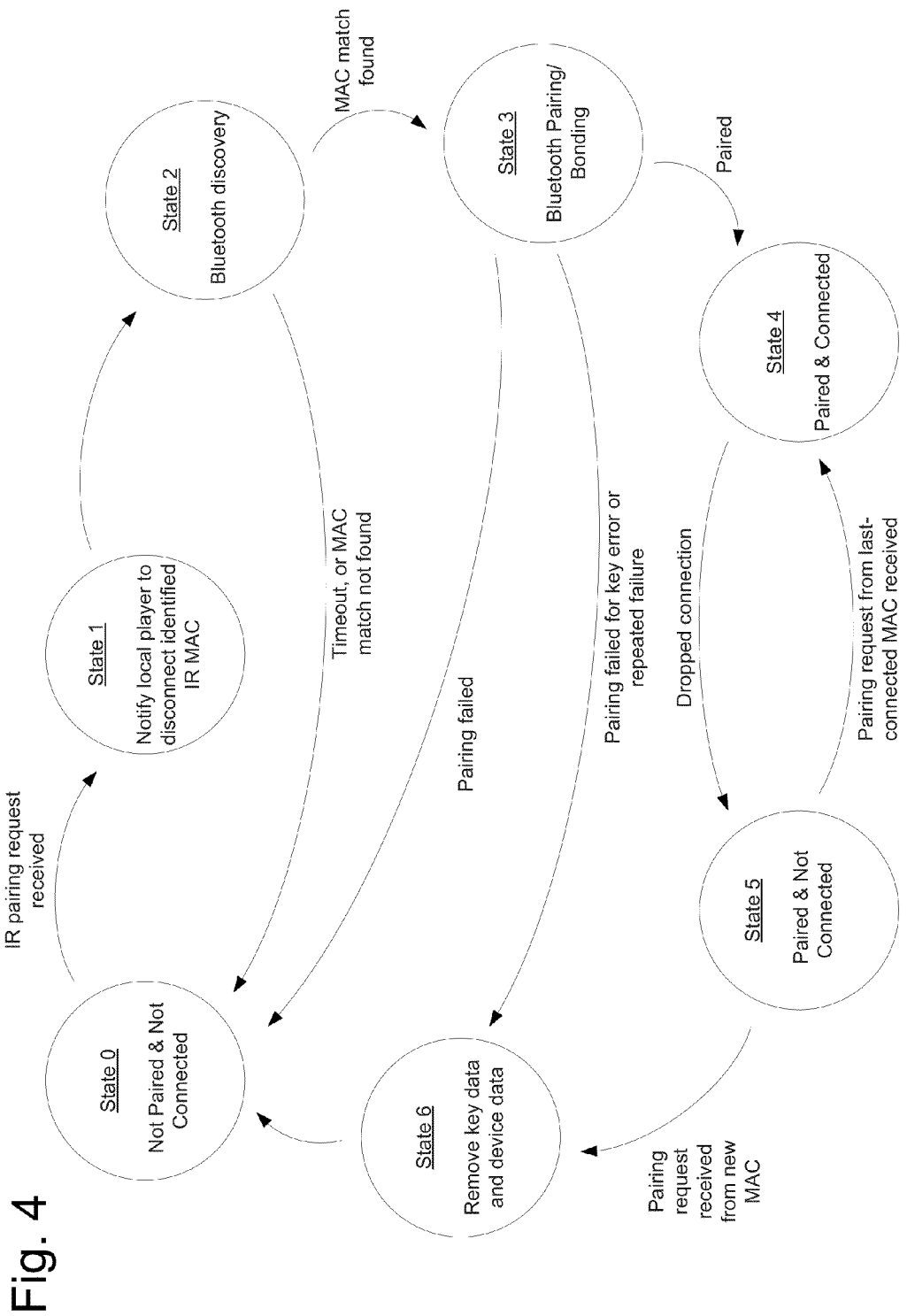
FIG. 4 illustrates an example state diagram for the player, in accordance with various embodiments.

FIG. 4 illustrates an example state diagram for the player 122, in accordance with various embodiments. In various embodiments, the logic 210 of the remote control 128 may be configured to maintain or cause transitions between various logical states to effect the actions and operations described herein. For example, the player 122 may include a state where it is not paired and not connected with any remote control 128 (State 0). Upon receipt of a pairing request from a remote control 128, however, the player 122 may transition to State 1. At State 1, the player 122 may be configured to notify other local players 122 (such as players 122 that are present on the network 106) to disconnect the remote control 128 that was identified in the pairing request.

Next, the player 122 may transition to State 2, where the player 122 may perform Bluetooth™ discovery, as may be understood. While in this state, the player 122 may also be configured to authorize the MAC address received in the pairing request against its MAC table 225. From State 2, if no match is found to authorize the remote control 128, or if a timeout occurs, then the player 122 may return to State 0, where it is not paired and not connected, if however, the MAC address is matched, and thus the remote control 128 is authorized to control the player 122, then the player 122 may transition to State 3, where Bluetooth™ pairing/bonding between the player 122 and the remote control 128 may occur, as may be understood. If the player 122 is unable to perform the pairing, then the player 122 may transition to State 0. If, by contrast, the player 122 and remote control 128 experience repeated failure or an encryption key error, then the player 122 may transition to State 6, where the player 122 may remove encryption key and device data that was shared from the remote control 128, and then transition to State 0.

If, however, the player 122 pairs with the remote control 128, then the player 122 may transition to State 4, where the two devices may be paired and connected. If the player 122 drops the connection with the remote control 128, then the player 122 may transition to State 5, where it may be paired and not connected. From State 5, if the player 122 receives another pairing request identifying the same MAC address as previously received during pairing communications, then the player 122 may understand that the last-connected remote control 128 is attempting to re-establish connection, and may return to State 4, where the two devices are connected. If, however, the player 122, while at State 5, receives a pairing request from a new remote control 128 (such as one identified by a MAC address other than that used in the last pairing), then the player 122 may transition to State 6, where the device and key data for the last-paired remote control 128 may be removed, and the player 122 may then return to State 0, where it is not paired and not connected.

Figure 5:
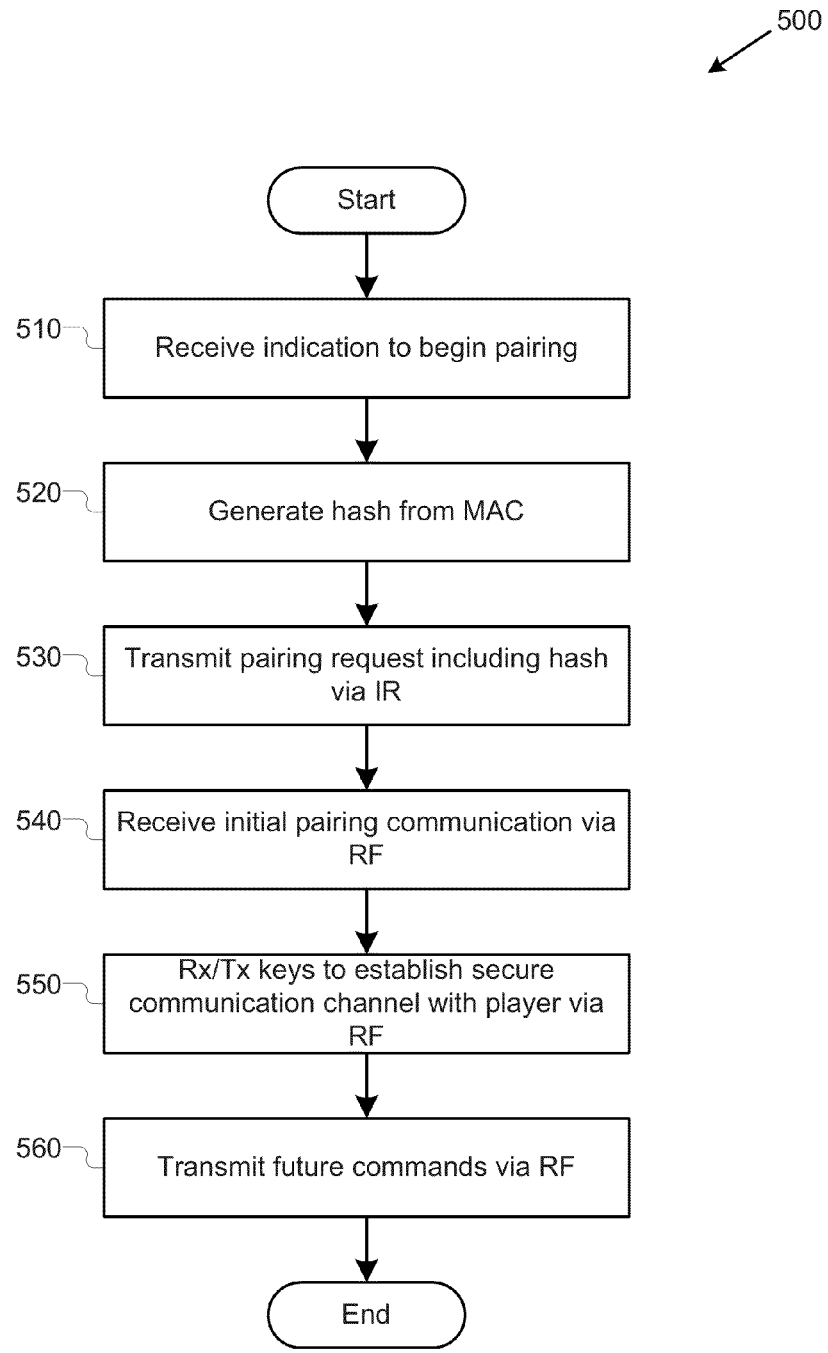
FIG. 5 illustrates an example process preformed by the remote control for controlling the player, in accordance with various embodiments.

FIG. 5 illustrates an example process 500 preformed by the remote control 128 for controlling the player 122, in accordance with various embodiments. While FIG. 5 illustrates particular example operations for process 500, in various embodiments, process 500 may include additional operations, omit illustrated operations, and/or combine illustrated operations. The process may begin at operation 510, where the remote control 128 may receive an indication to begin pairing with the player 122. In various embodiments, this indication may be received e.g., from a user, via activation of a pairing button 270, insertion of batteries into the remote control 128, and/or removal of a tab or other non-conductive material to complete a power circuit in the remote control 128.

Next, at operation 520, the remote control 128 may generate a hash from its internally-maintained MAC address 215. Next, the remote control 128 may transmit a pairing request that includes the hash of the MAC address 215 to the player 122 via the IR transmitter 250. In some embodiments, while use of a hash may reduce complexity and/or length of the pairing request, rather than generate a hash, the remote control 128 may include the MAC address 215 without additional processing.

Next, at operation 540, the remote control 128 may receive an initial pairing communication from the player 122. This initial pairing communication may, in various embodiments, be transmitted and received, via the RF transceivers 265 and 260, respectively. In various embodiments, this initial communication may identify the remote control 128, such as by the MAC address 215. Next, at operation 550, the remote control 128 may receive and transmit encryption keys with the player 122 to establish the secure communication channel to be used for subsequent communications. In various embodiments, communications performed at operation 550 may also be performed via the RF transceivers 265 and 260. Next, at operation 560, the remote control 128 may transmit commands via the RF transceiver 260 to the player 122 via the established secure communication channel. In various embodiments, operations 540-560 may include one or more implementations of Bluetooth™ pairing and connection communications, as may be understood, the process may then end.

Figure 6:
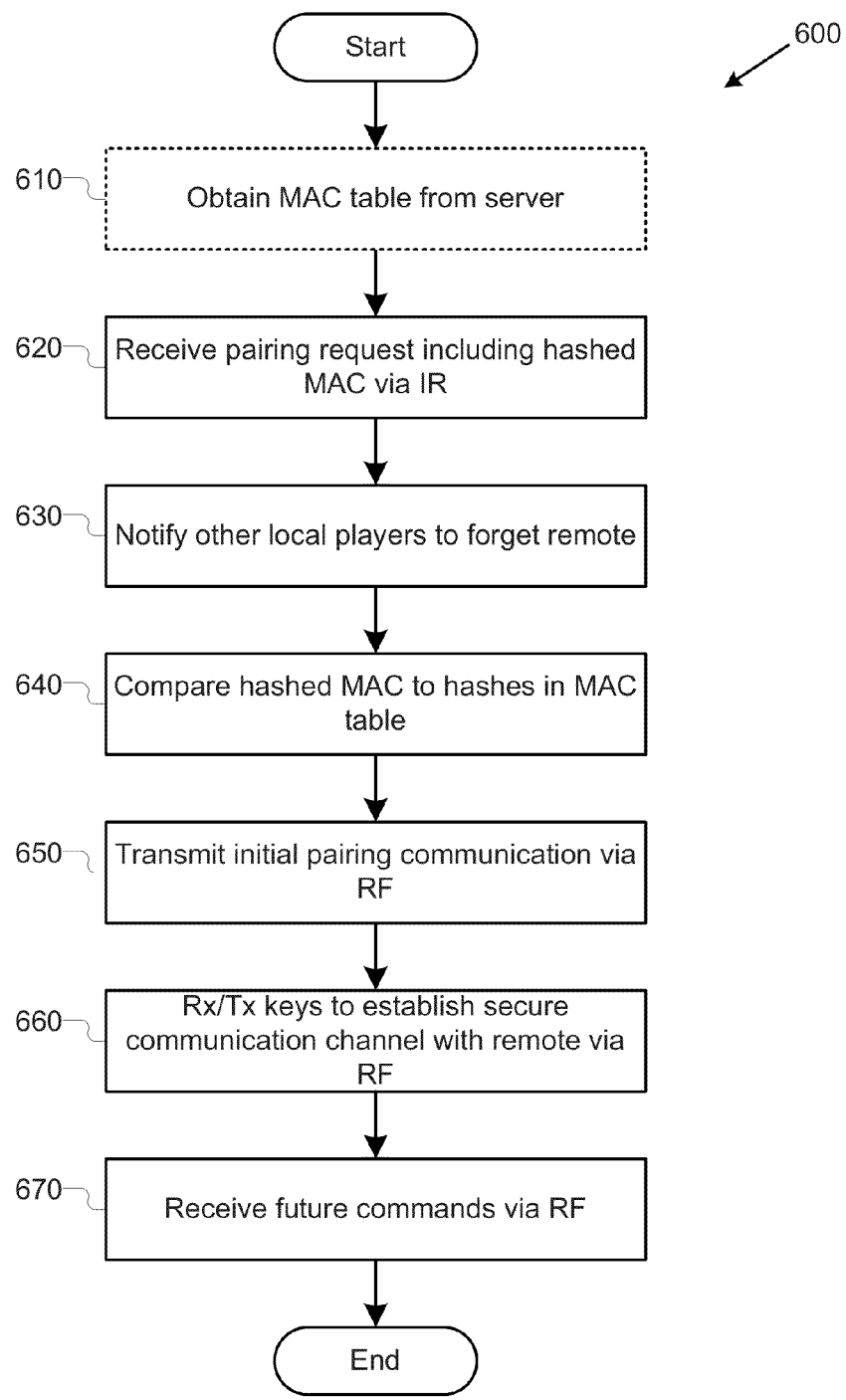
FIG. 6 illustrates an example process preformed by the player for accepting control from the remote control, in accordance with various embodiments.

FIG. 6 illustrates an example process 600 preformed by the player 122 for accepting control from the remote control 128, in accordance with various embodiments. While FIG. 6 illustrates particular example operations for process 600, in various embodiments, process 600 may include additional operations, omit illustrated operations, and/or combine illustrated operations. The process may begin at operation 610, where the player 122 may optionally obtain the MAC table 225 from an outside server. Next, at operation 620, the player 122 may receive a pairing request from the remote control 128 that includes the hashed MAC. In various embodiments, the player 122 may receive the request via its IR receiver 255. Next, at operation 630, the player 122 may notify other players 122, such as those on network 106, to forget the remote control 128 identified by the received MAC address 122.

Next, at operation 640, the player 122 may compare the hashed MAC address to hashes maintained in its MAC table 225. In embodiments where the remote control 128 sends an unhashed MAC address 215 in its pairing request, the player 122 may be configured to compare the actual MAC address 215 to those in its MAC table 225. If the player 122 determines at operation 640 that the remote control 128 is not authorized, then the process may then end. If, however, the remote control 128 is authorized, then at operation 650, the player 122 may transmit an initial pairing communication to the remote control 128. In various embodiments, this initial pairing communication may be transmitted by the RF transceiver 265 and received by the RF transceiver 260. The initial pairing communication may, in various embodiments, identify the remote control 128, such as by the MAC address 215, Next, at operation 660, the player 122 may receive and transmit encryption keys with the remote control 128 to establish the secure communication channel to be used for subsequent communications. In various embodiments, communications performed at operation 660 may also be performed via the RF transceivers 265 and 260. Next, at operation 670, the player 122 may receive commands via the RF transceiver 265 from the remote control 128 via the established secure communication channel. In various embodiments, operations 650-670 may include one or more implementations of Bluetooth™ pairing and connection communications, as may be understood, the process may then end.

Figure 7:
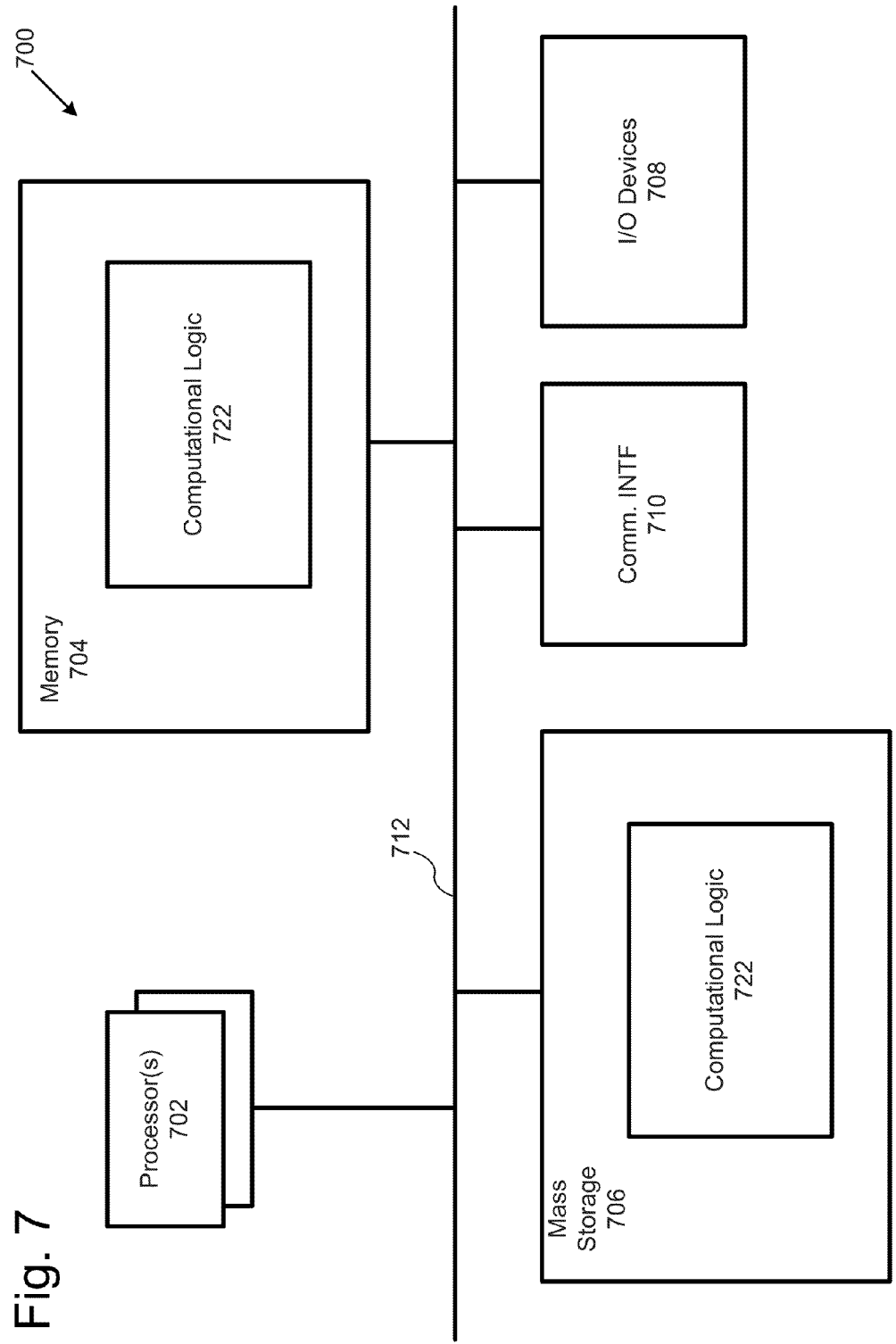
FIG. 7 illustrates an example computing environment suitable for practicing various aspects of the present disclosure, in accordance with various embodiments.

Referring now to FIG. 7, an example computing device suitable for use as various components to practice processes of FIGS. 5 and 6 is illustrated in accordance with various embodiments. As shown, computing device 700 may include one or more processors or processor cores 702, and system memory 704. For the purpose of this application, including the claims, the terms "processor" and "processor cores" may be considered synonymous, unless the context clearly requires otherwise. Additionally, computing device 700 may include mass storage devices 706 (such as diskette, hard drive, compact disc read only memory (CD-ROM) and so forth), input/output devices 708 (such as display, keyboard, cursor control, remote control, gaming controller, image capture device, and so forth) and communication interfaces 710 (such as network interface cards, modems, infrared receivers, radio receivers (e.g., Bluetooth), and so forth). The elements may be coupled to each other via system bus 712, which may represent one or more buses. In the case of multiple buses, they may be bridged by one or more bus bridges (not shown).

Each of these elements may perform its conventional functions known in the art. In particular, system memory 704 and mass storage devices 706 may be employed to store a working copy and a permanent copy of the programming instructions implementing the operations associated with content consumption device 108, e.g., operations associated with player 122 or remote control 128, shown in FIGS. 3-5. The various elements may be implemented by assembler instructions supported by processors) 602 or high-level languages, such as, for example, C, that can be compiled into such instructions.

The permanent copy of the programming instructions may be placed into permanent storage devices 706 in the factory, or in the field, through, for example, a distribution medium (not shown), such as a compact disc (CD), or through communication interface 710 (from a distribution server (not shown)). That is, one or more distribution media having an implementation of the agent program may be employed to distribute the agent and program various computing devices.

The number, capability and/or capacity of these elements 710-712 may vary, depending on whether computing device r 700 is used as a content aggregator/distributor server 104, content consumption device 108 with player 122, or remote control 128. Their constitutions are otherwise known, and accordingly will not be further described.

Figure 8:
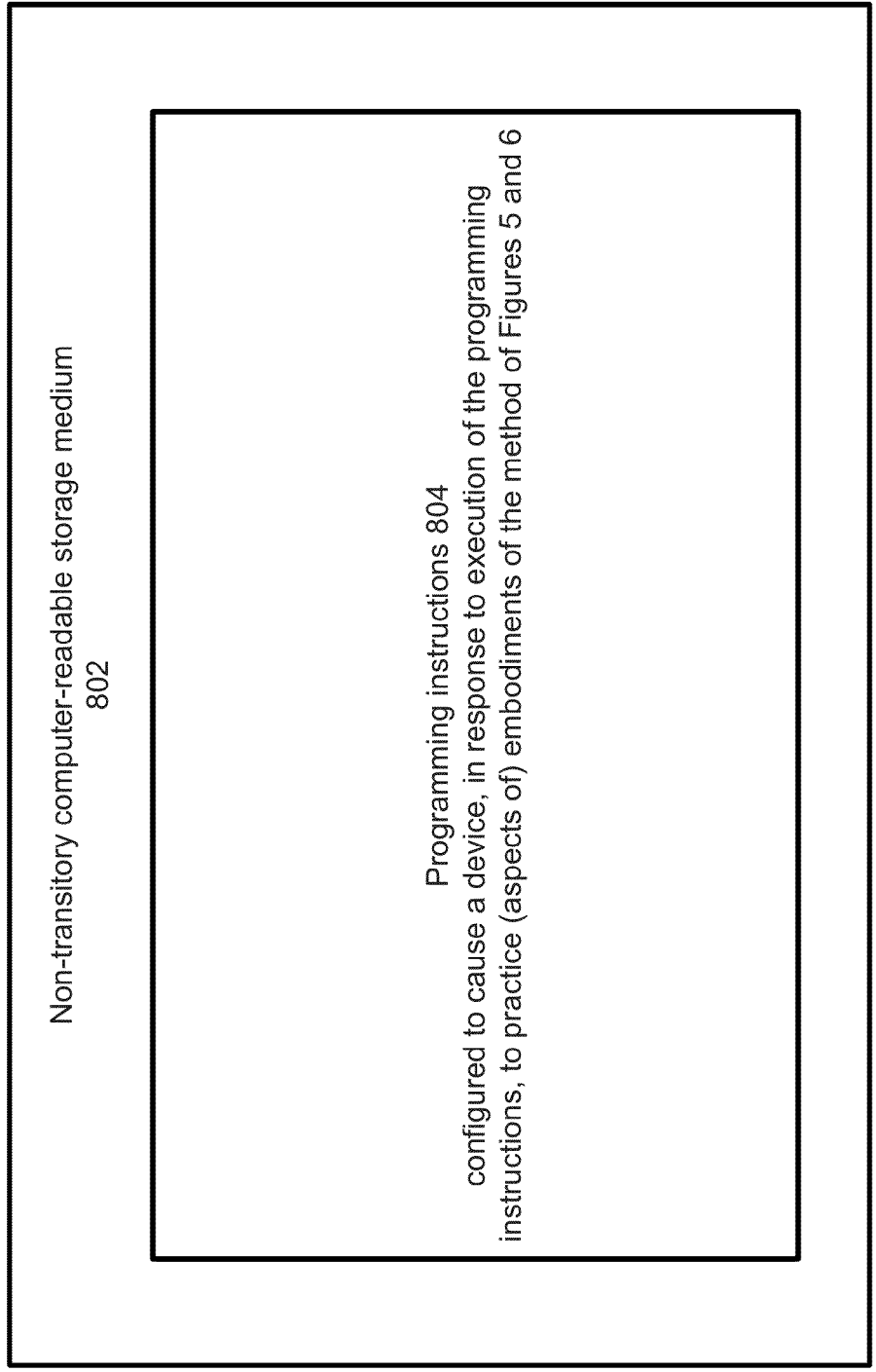
FIG. 8 illustrates an example storage medium with instructions configured to enable an apparatus to practice various aspects of the present disclosure, in accordance with various embodiments.

FIG. 8 illustrates an example least one computer-readable storage medium 802 having instructions configured to practice all or selected ones of the operations associated with content consumption devices 108, earlier described, in accordance with various embodiments. As illustrated, least one computer-readable storage medium 802 may include a number of programming instructions 804. Programming instructions 804 may be configured to enable a device, e.g., computing device 700, in response to execution of the programming instructions, to perform, e.g., various operations of processes of FIGS. 5 and 6, e.g., but not limited to, to the various operations performed to perform pairing and connection of the remote control 128 and the player 122. In alternate embodiments, programming instructions 804 may be disposed on multiple least one computer-readable storage media 802 instead.

Referring back to FIG. 7, for one embodiment, at least one of processors 702 may be packaged together with computational logic 722 configured to practice aspects of processes of FIGS. 5 and/or 6. For one embodiment, at least one of processors 702 may be packaged together with computational logic 722 configured to practice aspects of processes of FIGS. 5 and/or 6 to form a System in Package (SiP). For one embodiment, at least one of processors 702 may be integrated on the same die with computational logic 722 configured to practice aspects of processes of FIGS. 5 and/or 6. For one embodiment, at least one of processors 702 may be packaged together with computational logic 722 configured to practice aspects of processes of FIGS. 5 and 6 to form a System on Chip (SoC). For at least one embodiment, the SoC may be utilized in, e.g., but not limited to, a computing tablet.

Various embodiments of the present disclosure have been described. These embodiments include, but are not limited to, those described in the following paragraphs.

Example 1 may include an apparatus for controlling a controllable device. The apparatus may include: a wireless transmitter configured to send non-secured signals and a wireless transceiver configured to facilitate send and receive of secured signals over a secure communication channel. The apparatus may also include logic operably coupled with the wireless transmitter and wireless transceiver and configured to: send a non-secure pairing request to the controllable device, via the wireless transmitter, wherein the pairing request includes an identifier for the apparatus that identifies the apparatus as an eligible pairing device to the controllable device and is pre-programmed into the apparatus to facilitate secured pairing without separate user entry of a security code; receive communication from the controllable device, via the wireless transceiver, to establish a secure communication channel between the controllable device and the wireless transceiver; and exchange communication with the controllable device, via the wireless transceiver and over the secure communication channel, to pair the controllable device with the apparatus to enable the apparatus to subsequently control the controllable device.

Example 2 may include the apparatus of example 1, and further specify that the wireless transmitter includes a line-of-sight wireless transmitter.

Example 3 may include the apparatus of example 2, and further specify that the wireless transmitter includes an infrared transmitter.

Example 4 may include the apparatus of example 1, and further specify that the wireless transceiver includes a radio frequency transceiver.

Example 5 may include the apparatus of example 4, and further specify that the radio frequency transceiver is configured to communicate with the device using the Bluetooth protocol.

Example 6 may include the apparatus of any of examples 1-5, and further specify that the identifier for the apparatus is based at least in part on a media access control (MAC) address for the apparatus.

Example 7 may include the apparatus of example 6, and further specify that the logic is further configured to generate a hash of the MAC address for the apparatus as the identifier for the apparatus Example 8 may include the apparatus of any of examples 1-5, and further specify that the logic is further configured to receive an indication to establish the secure communication channel from a user and to send the pairing request in response to receipt of the indication.

Example 9 may include the apparatus of example 8, and further specify that the apparatus further includes a pairing button and that the indication to establish the secure communication channel includes receiving an activation of the button by the user.

Example 10 may include the apparatus of example 8, and further specify that the indication to establish the secure communication channel includes receiving insertion of a battery by the user.

Example 11 may include the apparatus of any of examples 1-5, and further specify that the apparatus includes a remote control.

Example 12 may include a computer-implemented method for controlling a controllable device. The method may include: sending, using a wireless transmitter of a computing device configured to send non-secured signals, a non-secured pairing request to the controllable device, wherein the pairing request includes an identifier for the computing device that identifies the computing device as an eligible pairing device to the controllable device and is pre-programmed into the computing device to facilitate secured pairing without separate user entry of a security code; receiving, using a wireless transceiver of the computing device configured to facilitate sending and receiving of secured signals over a secure communication channel, communication from the controllable device to establish of a secure communication channel between the controllable device and the wireless transceiver; and exchanging communication with the controllable device, via the wireless transceiver and over the secure communication channel, to pair the controllable device with the computing device to enable the computing device to subsequently control the controllable device.

Example 13 may include the method of example 12, and further specify that the wireless transmitter includes a line-of-sight wireless transmitter.

Example 14 may include the method of example 13, and further specify that the wireless transmitter includes an infrared transmitter.

Example 15 may include the method of example 12, and further specify that the wireless transceiver includes a radio frequency transceiver.

Example 16 may include the method of example 15, and further specify that the radio frequency transceiver is configured to communicate with the device using the Bluetooth protocol.

Example 17 may include the method of any of examples 12-16, and further specify that sending the pairing request includes sending the identifier based at least in part on a media access control (MAC) address for the computing device.

Example 18 may include the method of example 17, further including generating, by the computing device, a hash of the MAC address for the computing device as the identifier for the computing device.

Example 19 may include the method of any of examples 12-16, and further specify that the method further includes receiving, by the computing device, an indication to establish the secure communication channel from a user and that sending the pairing request includes sending the pairing request in response to receipt of the indication.

Example 20 may include the method of example 19, and further specify that the computing device further includes a pairing button and that receiving the indication to establish the secure communication channel includes receiving an activation of the button by the user.

Example 21 may include the method of example 29, and further specify that receiving the indication to establish the secure communication channel includes receiving insertion of a battery by the user.

Example 22 may include an apparatus for controlling a controllable device. The apparatus may include: means for sending a non-secure pairing request to the controllable device, wherein the pairing request includes an identifier for the apparatus that identifies the apparatus as an eligible pairing device to the controllable device and is pre-programmed into the apparatus to facilitate secured pairing without separate user entry of a security code; means for receiving a communication from the controllable device to establish a secure communication channel with the controllable device; and means for exchanging communication with the controllable device to pair the controllable device with the apparatus to enable the apparatus to subsequently control the controllable device.

Example 23 may include the apparatus of example 22, and further specify that the means for sending includes a line-of-sight wireless transmitter.

Example 24 may include the apparatus of example 23, and further specify that the line-of-sight wireless transmitter includes an infrared transmitter.

Example 25 may include the apparatus of example 22, and further specify that the means for includes a radio frequency transceiver.

Example 26 may include the apparatus of example 25, and further specify that the radio frequency transceiver is configured to communicate with the device using the Bluetooth protocol.

Example 27 may include the apparatus of any of examples 22-26, and further specify that means for sending the pairing request includes means for sending the identifier based at least in part on a media access control (MAC) address for the apparatus.

Example 28 may include the apparatus of example 27, further including means for generating a hash of the MAC address for the apparatus as the identifier for the apparatus.

Example 29 may include the apparatus of any of examples 22-26, and further specify that the apparatus further includes means for receiving an indication to establish the secure communication channel from a user and that means for sending the pairing request includes means for sending the pairing request in response to receipt of the indication.

Example 30 may include the apparatus of example 29, and further specify that the apparatus further includes a pairing button and that means for receiving the indication to establish the secure communication channel includes means for receiving an activation of the button by the user.

Example 31 may include the apparatus of example 29, and further specify that means for receiving the indication to establish the secure communication channel includes means for receiving insertion of a battery into the apparatus by the user.

Example 32 may include one or more computer-readable media containing instructions written thereon that, when executed on a computing device, cause the computing device to control a controllable device by causing the computing device to: send, using a wireless transmitter of the computing device configured to send non-secured signals, a non-secured pairing request to a controllable device, wherein the pairing request includes an identifier for the computing device that identifies the computing device as an eligible pairing device to the controllable device and is pre-programmed into the computing device to facilitate secured pairing without separate user entry of a security code; receive, using a wireless transceiver of the computing device and configured to facilitate send and receive of secured signals over a secure communication channel, a communication from the controllable device to establish a secure communication channel between the controllable device and the wireless transceiver; and exchange communication with the controllable device, via the wireless transceiver and over the secure communication channel, to pair the controllable device with the computing device to enable the computing device to subsequently control the controllable device.

Example 33 may include the computer-readable media of example 32, and further specify that the wireless transmitter includes a line-of-sight wireless transmitter.

Example 34 may include the computer-readable media of example 33, and further specify that the wireless transmitter includes an infrared transmitter.

Example 35 may include the computer-readable media of example 32, and further specify that the wireless transceiver includes a radio frequency transceiver.

Example 36 may include the computer-readable media of example 35, and further specify that the radio frequency transceiver is configured to communicate with the device using the Bluetooth protocol.

Example 37 may include the computer-readable media of any of examples 32-36, and further specify that send the pairing request includes send the identifier based at least in part on a media access control (MAC) address for the computing device.

Example 38 may include the computer-readable media of example 37, and further specify that the instructions are further configured to cause the computing device to generate a hash of the MAC address for the computing device as the identifier for the computing device.

Example 39 may include the computer-readable media of any of examples 32-36, and further specify that the instructions are further configured to cause the computing device to receive an indication to establish the secure communication channel from a user and that send the pairing request includes send the pairing request in response to receipt of the indication.

Example 40 may include the computer-readable media of example 39, and further specify that the computing device further includes a pairing button and that receive the indication to establish the secure communication channel includes receive an activation of the button by the user.

Example 41 may include the computer-readable media of example 39, and further specify that receive the indication to establish the secure communication channel includes receive insertion of a battery by the user.

Example 42 may include an apparatus for receiving control from a remote control device, the apparatus may include a wireless receiver configured to receive non-secured signals and a wireless transceiver configured to facilitate send and receive of secured signals over a secure communication channel. The apparatus may also include logic operably coupled with the wireless receiver and wireless transceiver and configured to: receive a non-secured pairing request from the remote control device via the wireless receiver, wherein the pairing request includes an identifier for the remote control device that identifies the remote control device as an eligible pairing device to the apparatus and is pre-programmed into the remote control device to facilitate secured pairing without separate user entry of a security code; send communication to the remote control device, via the wireless transceiver, to establish a secure communication channel between the remote control device and the wireless transceiver; and exchange communication with the remote control device, via the wireless transceiver and over the secure communication channel, to pair the remote control device with the apparatus to enable the remote control device to subsequently control the apparatus.

Example 43 may include the apparatus of example 42, and further specify that the logic is further configured to determine whether the remote control device is authorized to communicate with the apparatus based at least in part on the identifier of the remote control device and if the remote control device is authorized, send the pairing communication.

Example 44 may include the apparatus of example 43, and further specify that determine whether the remote control device is authorized to communicate with the apparatus includes compare the identifier of the remote control device against known authorized identifiers.

Example 45 may include the apparatus of example 44, and further specify that the logic is further configured to obtain, over a network, a list of known authorized identifiers.

Example 46 may include the apparatus of any of examples 42-45, and further specify that the identifier for the remote control device is based at least in part on a media access control (MAC) address for the remote control device.

Example 47 may include the apparatus of any of examples 42-45, and further specify that the wireless receiver includes a line-of-sight wireless receiver.

Example 48 may include the apparatus of example 47, and further specify that the wireless receiver includes an infrared receiver.

Example 49 may include the apparatus of any of examples 42-45, and further specify that the wireless transceiver includes a radio frequency transceiver.

Example 50 may include the apparatus of example 49, and further specify that the radio frequency transceiver is configured to communicate with the remote control device using the Bluetooth protocol.

Example 51 may include an computer-implemented method for receiving control from a remote control device, the method including: receiving, using a wireless receiver of a computing device configured to receive non-secured signals from the remote control device, a non-secured pairing request from the remote control device, wherein the pairing request includes an identifier for the remote control device that identifies the remote control device as an eligible pairing device to the apparatus and is pre-programmed into the remote control device to facilitate secured pairing without separate user entry of a security code; sending, using a wireless transceiver configured to facilitate send and receive of secured signals from the remote control device via the secure communication channel, communication to the remote control device to establish a secure communication channel between the remote control device and the wireless transceiver; and exchanging communication with the remote control device, via the wireless transceiver and over the secure communication channel, to pair the remote control device with the computing device to enable the remote control device to subsequently control the computing device.

Example 52 may include the method of example 51, and may further include: determining, by the computing device, whether the remote control device is authorized to communicate with the apparatus based at least in part on the identifier of the remote control device; and if the remote control device is authorized, sending, by the computing device, the pairing communication.

Example 53 may include the method of example 52, and further specify that determining whether the remote control device is authorized to communicate with the apparatus includes comparing the identifier of the remote control device against known authorized identifiers.

Example 54 may include the method of example 53, further including obtaining, by the computing device, over a network, a list of known authorized identifiers.

Example 55 may include the method of any of examples 51-54, and further specify that the identifier for the remote control device is based at least in part on a media access control (MAC) address for the remote control device.

Example 56 may include the method of any of examples 51-54, and further specify that the wireless receiver includes a line-of-sight wireless receiver.

Example 57 may include the method of example 56, and further specify that the wireless receiver includes an infrared receiver.

Example 58 may include the method of any of examples 51-54, and further specify that the wireless transceiver includes a radio frequency transceiver.

Example 59 may include the method of example 58, and further specify that the radio frequency transceiver is configured to communicate with the remote control device using the Bluetooth protocol.

Example 60 may include an apparatus for receiving control from a remote control device, the apparatus including: means for receiving a non-secure pairing request from the remote control device, wherein the pairing request includes an identifier for the remote control device that identifies the remote control device as an eligible pairing device to the apparatus and is pre-programmed into the remote control device to facilitate secured pairing without separate user entry of a security code; means for sending a pairing communication to the remote control device to establish a secure communication channel with the remote control device; and means for exchanging communication with the remote control device to pair the remote control device with the apparatus to enable the remote control to subsequently control the apparatus.

Example 61 may include the apparatus of example 60, and may further include: means for determining whether the remote control device is authorized to communicate with the apparatus based at least in part on the identifier of the remote control device; and means for, if the remote control device is authorized, sending the pairing communication.

Example 62 may include the apparatus of example 61, and further specify that determining whether the remote control device is authorized to communicate with the apparatus includes comparing the identifier of the remote control device against known authorized identifiers.

Example 63 may include the apparatus of example 62, further including means for obtaining, over a network, a list of known authorized identifiers.

Example 64 may include the apparatus of any of examples 60-63, and further specify that the identifier for the remote control device is based at least in part on a media access control (MAC) address for the remote control device.

Example 65 may include the apparatus of any of examples 60-63, and further specify that the means for receiving includes a line-of-sight wireless receiver.

Example 66 may include the apparatus of example 65, and further specify that the line-of-sight wireless receiver includes an infrared receiver.

Example 67 may include the apparatus of any of examples 60-63, and further specify that the means for sending includes a radio frequency transceiver.

Example 68 may include the apparatus of example 67, and further specify that the radio frequency transceiver is configured to communicate with the remote control device using the Bluetooth protocol.

Example 69 may include one or more computer-readable media containing instructions written thereon that, when executed on a computing device, cause the computing device to receive control from a remote control device by causing the device to: receive, using a wireless receiver of a computing device configured to receive non-secured signals from the remote control device, a non-secured pairing request from the remote control device, wherein the pairing request includes an identifier for the remote control device that identifies the remote control device as an eligible pairing device to the apparatus and is pre-programmed into the remote control device to facilitate secured pairing without separate user entry of a security code; send, using a wireless transceiver configured to facilitate send and receive of secured signals from the remote control device via the secure communication channel, communication to the remote control device to establish a secure communication channel between the remote control device and the wireless transceiver; and exchange communication with the remote control device, via the wireless transceiver and over the secure communication channel, to pair the remote control device with the computing device to enable the remote control device to subsequently control the computing device.

Example 70 may include the computer-readable media of example 69, and further specify that the instructions are further configured to cause the computing device to: determine whether the remote control device is authorized to communicate with the computing device based at least in part on the identifier of the remote control device; and if the remote control device is authorized, send the pairing communication.

Example 71 may include the computer-readable media of example 70, and further specify that determine whether the remote control device is authorized to communicate with the apparatus includes compare the identifier of the remote control device against known authorized identifiers.

Example 72 may include the computer-readable media of example 71, and further specify that the instructions are further configured to cause the computing device to obtain, over a network, a list of known authorized identifiers.

Example 73 may include the computer-readable media of any of examples 69-72, and further specify that the identifier for the remote control device is based at least in part on a media access control (MAC) address for the remote control device.

Example 74 may include the computer-readable media of any of examples 69-72, and further specify that the wireless receiver includes a line-of-sight wireless receiver.

Example 75 may include the computer-readable media of example 74, and further specify that the wireless receiver includes an infrared receiver.

Example 76 may include the computer-readable media of any of examples 69-72, and further specify that the wireless transceiver includes a radio frequency transceiver.

Example 77 may include the computer-readable media of example 76, and further specify that the radio frequency transceiver is configured to communicate with the remote control device using the Bluetooth protocol.

Computer-readable media (including least one computer-readable media), methods, apparatuses, systems and devices for performing the above-described techniques are illustrative examples of embodiments disclosed herein. Additionally, other devices in the above-described interactions may be configured to perform various disclosed techniques.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. An apparatus, the apparatus including:
a wireless transmitter configured to send non-secured signals;
a wireless transceiver configured to facilitate send and receive of secured signals over a secure communication channel; and
logic operably coupled with the wireless transmitter and the wireless transceiver and configured to:
receive an indication to establish the secure communication channel from a user;
in response to receipt of the indication, send a non-secured pairing request to a controllable device via the wireless transmitter, wherein the pairing request includes an identifier for the apparatus that identifies the apparatus as an eligible pairing device to the controllable device and is pre-programmed into the apparatus to facilitate secured pairing without separate user entry of a security code;
receive communication from the controllable device, via the wireless transceiver, to establish a secure communication channel between the controllable device and the wireless transceiver; and
exchange communication with the controllable device, via the wireless transceiver and over the secure communication channel, to pair the controllable device with the apparatus to enable the apparatus to subsequently control the controllable device.

2. The apparatus of claim 1, wherein the wireless transmitter comprises a line-of-sight wireless transmitter.

3. The apparatus of claim 2, wherein the wireless transmitter comprises an infrared transmitter.

4. The apparatus of claim 1, wherein the wireless transceiver comprises a radio frequency transceiver.

5. The apparatus of claim 4, wherein the radio frequency transceiver is configured to communicate with the device using a Bluetooth protocol.

6. The apparatus of claim 1, wherein the identifier for the apparatus is based at least in part on a media access control (MAC) address for the apparatus.

7. The apparatus of claim 6, wherein the logic is further configured to generate a hash of the MAC address for the apparatus as the identifier for the apparatus.

8. The apparatus of claim 1, wherein:
the apparatus further comprises a pairing button; and
the indication to establish the secure communication channel comprises receiving an activation of the button by the user.

9. The apparatus of claim 1, wherein:
the indication to establish the secure communication channel comprises receiving insertion of a battery by the user.

10. The apparatus of claim 1, wherein the apparatus comprises a remote control.

11. An apparatus including:
a wireless receiver configured to receive non-secured signals;
a wireless transceiver configured to facilitate send and receive of secured signals over a secure communication channel
logic operably coupled with the wireless receiver and the wireless transceiver and configured to:
receive a non-secured pairing request sent from a remote control device via the wireless receiver in response to an indication to establish the secure communication channel from a user, wherein the pairing request includes an identifier for the remote control device that identifies the remote control device as an eligible pairing device to the apparatus and is pre-programmed into the remote control device to facilitate secured pairing without separate user entry of a security code;
send communication to the remote control device, via the wireless transceiver, to establish a secure communication channel between the remote control device and the wireless transceiver; and
exchange communication with the remote control device, via the wireless transceiver and over the secure communication channel, to pair the remote control device with the apparatus to enable the remote control device to subsequently control the apparatus.

12. The apparatus of claim 11, wherein the logic is further configured to:
determine whether the remote control device is authorized to communicate with the apparatus based at least in part on the identifier of the remote control device; and
if the remote control device is authorized, send the pairing communication.

13. The apparatus of claim 12, wherein determine whether the remote control device is authorized to communicate with the apparatus comprises compare the identifier of the remote control device against known authorized identifiers.

14. The apparatus of claim 13, wherein the logic is further configured to obtain, over a network, a list of known authorized identifiers.

15. The apparatus of claim 11, wherein the identifier for the remote control device is based at least in part on a media access control (MAC) address for the remote control device.

16. The apparatus of claim 11, wherein the wireless receiver comprises an infrared receiver.

17. The apparatus of claim 11, wherein the wireless transceiver comprises a radio frequency transceiver configured to communicate with the remote control device using a Bluetooth protocol.

18. A computer-implemented method including:
receiving, by a computing device, an indication to establish a secure communication channel from a user;
in response to receipt of the indication, sending, using an infrared transmitter of the computing device configured to send non-secured signals, a non-secured pairing request to a controllable device, wherein the pairing request includes an identifier for the computing device that identifies the computing device as an eligible pairing device to the controllable device and is pre-programmed into the computing device to facilitate secured pairing without separate user entry of a security code;
receiving, using a radio frequency transceiver of the computing device configured to facilitate sending and receiving of secured signals over the secure communication channel, communication from the controllable device to establish a secure communication channel between the controllable device and the wireless transceiver; and exchanging communication with the controllable device, via the wireless transceiver and over the secure communication channel, to pair the controllable device with the computing device to enable the computing device to subsequently control the controllable device.

19. The method of claim 18, wherein sending the pairing request comprises sending the identifier based at least in part on a media access control (MAC) address for the computing device.

20. The method of claim 18, wherein:
the computing device further comprises a pairing button; and
receiving the indication to establish the secure communication channel comprises receiving an activation of the button by the user.

21. An apparatus including:
means for receiving an indication to establish a secure communication channel from a user;
means for sending a non-secured pairing request to a controllable device in response to receipt of the indication, wherein the pairing request includes an identifier for the apparatus that identifies the apparatus as an eligible pairing device to the controllable device and is pre-programmed into the apparatus to facilitate secured pairing without separate user entry of a security code;
means for receiving a communication from the controllable device to establish the secure communication channel with the controllable device; and
means for exchanging communication with the controllable device to pair the controllable device with the apparatus to enable the apparatus to subsequently control the controllable device.

22. The apparatus of claim 21, wherein the means for sending the pairing request comprises means for sending the identifier based at least in part on a media access control (MAC) address for the apparatus.

23. One or more non-transitory computer-readable storage media comprising a plurality of instructions configured to cause a computing device, in response to execution of the instructions by the computing device, to:
receive an indication to establish a secure communication channel from a user
in response to receipt of the indication, send, using an infrared transmitter of the computing device that is configured to send non-secured signals, a non-secured pairing request to a controllable device, wherein the pairing request includes an identifier for the computing device that identifies the computing device as an eligible pairing device to the controllable device and is pre-programmed into the computing device to facilitate secured pairing without separate user entry of a security code;
receive, using a radio frequency transceiver of the computing device that is configured to facilitate sending and receiving of secured signals over a secure communication channel, communication from the controllable device to establish the secure communication channel between the controllable device and the wireless transceiver; and
exchange communication with the controllable device, via the wireless transceiver and over the secure communication channel, to pair the controllable device with the computing device to enable the computing device to subsequently control the controllable device.

24. The non-transitory computer-readable storage media of claim 23, wherein sending the pairing request comprises sending the identifier based at least in part on a media access control (MAC) address for the computing device.

25. The non-transitory computer-readable storage media of claim 23, wherein:
the computing device further comprises a pairing button; and
receiving the indication to establish the secure communication channel comprises receiving an activation of the button by the user.

* * * * *